Figure 1:
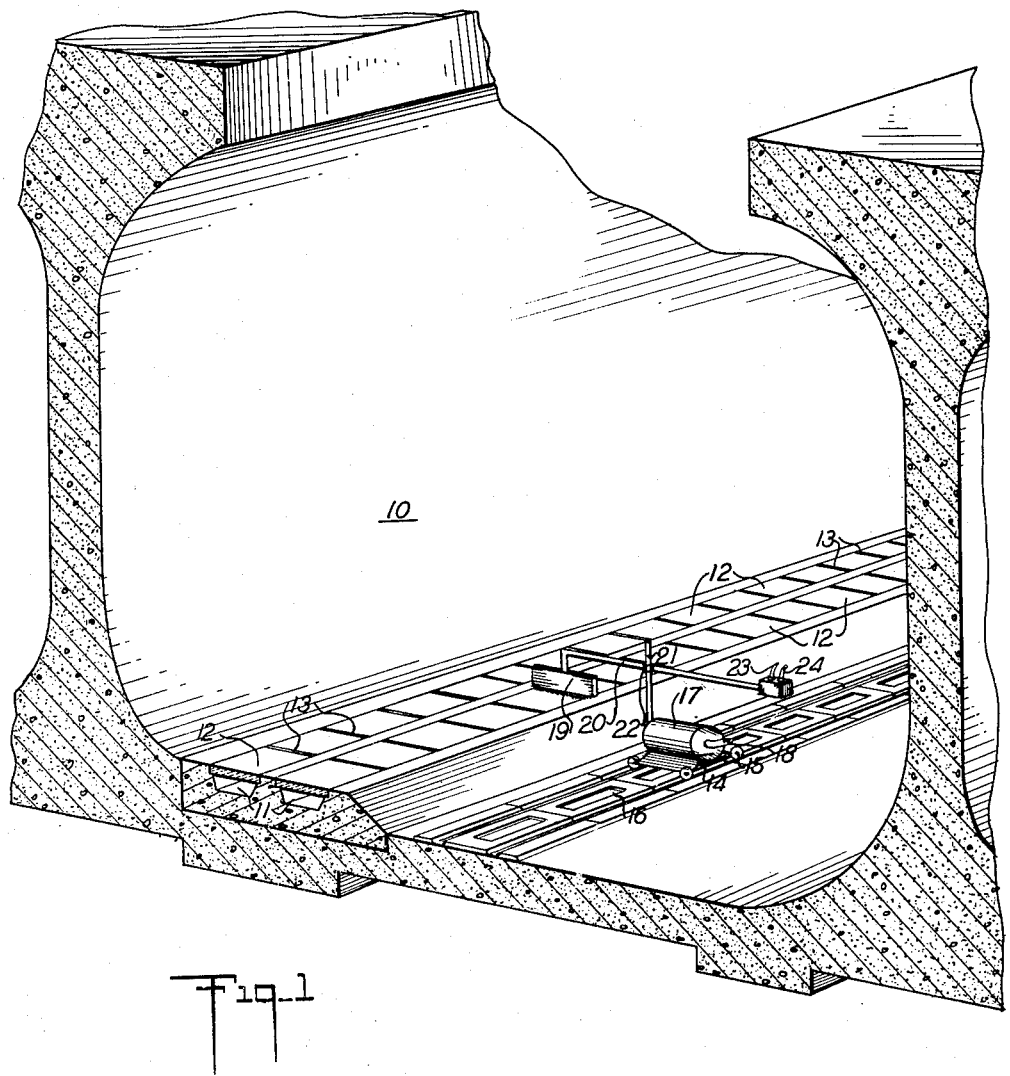

July 20, 1954     R. C. FRENCH     2,684,330
METHOD OF RENEWING DIFFUSER UNITS
Filed March 31, 1950     2 Sheets-Sheet 1

INVENTOR
RICHARD C. FRENCH
BY George H. Mitchell, Jr.

July 20, 1954
R. C. FRENCH
2,684,330
METHOD OF RENEWING DIFFUSER UNITS
Filed March 31, 1950
2 Sheets-Sheet 2
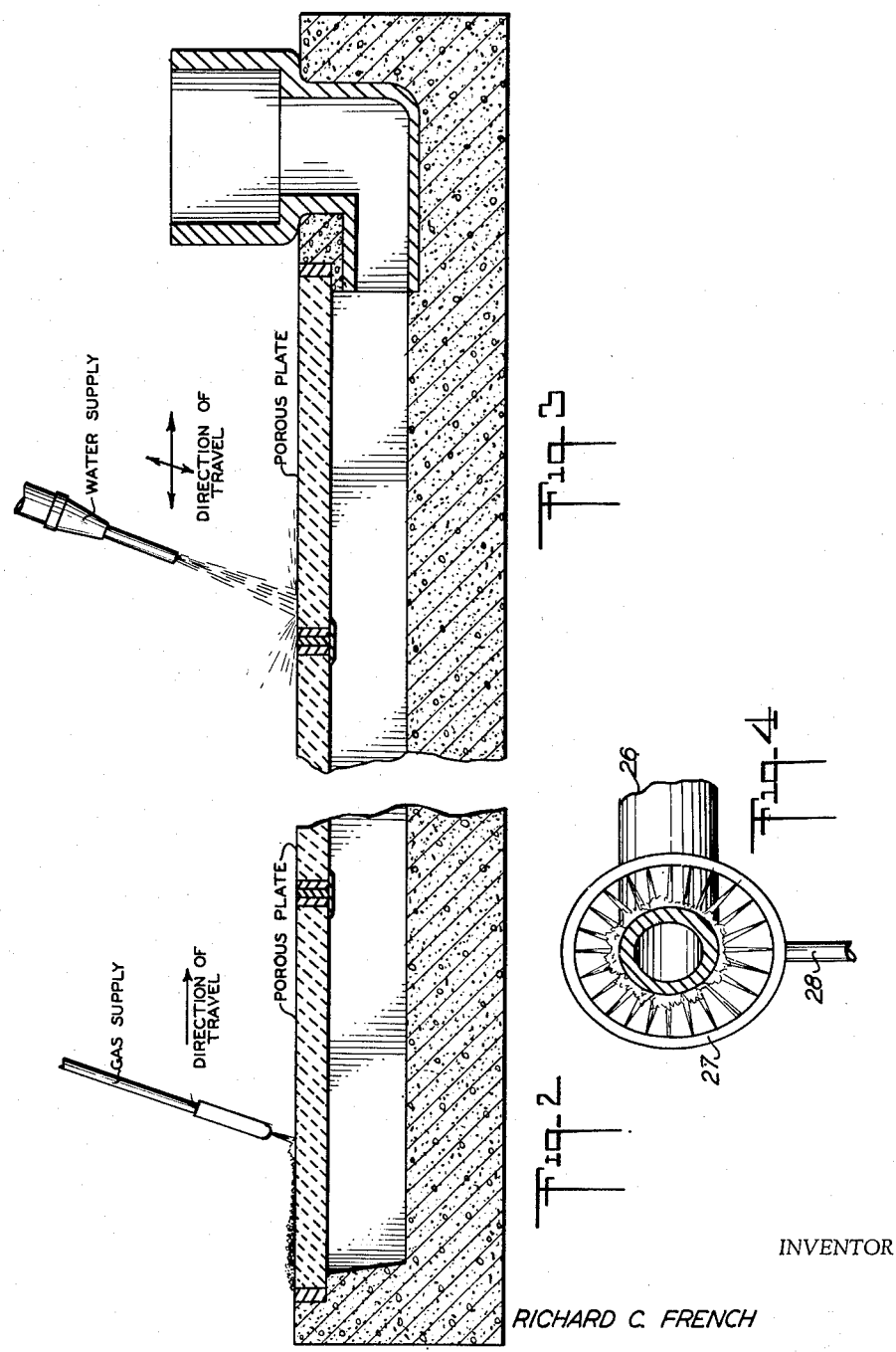
INVENTOR
RICHARD C. FRENCH
BY George H. Mitchell, Jr.

Patented July 20, 1954

2,684,330

UNITED STATES PATENT OFFICE 2,684,330

METHOD OF RENEWING DIFFUSER UNITS

Richard C. French, Brooklyn, N. Y.

Application March 31, 1950, Serial No. 153,037

3 Claims. (Cl. 210—8)

This invention relates to an improvement in the method of maintaining the porosity of diffuser media employed in aeration tanks as part of the so-called "activated sludge" process for purifying sewage.

In this process the sewage in the aeration tank is subjected to a thorough aeration to supply oxygen to the aerobic bacteria present in the "activated sludge." The "activated sludge" is used to purify the actual sewage so that it may be discarded safely. The air used to aerate the sludge is supplied to the bottom of the aeration tank through porous diffuser media which creates a stream of millions of tiny air bubbles. It is important that the air bubbles be small in size since, in this form, they rise more slowly through the sewage being treated and a more thorough aeration of the sludge is thus effected. In addition, the successful operation of this process requires a relatively large volume of air to be passed through the diffuser media.

The diffuser media may take several forms. In one form they comprise a number of flat plates made of aloxite granules cemented together with a ceramic bonding material. These plates form the top wall of an air supply duct formed along the length of the bottom of an aeration tank, and are held in place by means of cement grout around their edges. Another form of diffuser is generally cylindrical in shape, closed at one end, and provided with a coupling means at the other end for attaching it to the end of an air supply pipe. Still another form employs a hemispherical piece of ceramic material.

The precise material used in the construction of the diffuser media, or whether it be ceramic or carbonaceous in character, has no bearing on the problem which besets any porous article employed this manner. In time the diffuser media become clogged by biological growths which lower the efficiency of operation of the process by preventing the even and continuous passage of the air through the media employed. Excessive air pressure is required and aeration of the sewage in the tank is likely to be incomplete.

Specifically, the outer surface which is in contact with the treated sewage, becomes clogged by fine sand particles and organic materials including the above-mentioned biological growths. The organic materials apparently bind the sand particles together in such a manner that up to the present time no satisfactory method for washing the diffuser media in place has been discovered. In addition, the inner surface which is in contact only with the air supplied under pressure, is subject to a certain amount of clogging from impurities carried in by the air, but the condition of the inner surface is not nearly as severe as that of the outer surface and can usually be eliminated with the use of air filters.

It has been the prior practice, whenever the diffuser media became so clogged as to reduce the efficiency of the aeration process below an acceptable level, to replace the diffusers with new units or to make an attempt to clean them with suitable chemicals. In either case the diffusers had to be removed from the tank, and in the case of the flat plate diffuser it meant that the grouting had to be chipped away and new grouting applied to hold the substituted plate in position.

It is an object, therefore, of the present invention to disclose a method by which diffuser media which have become clogged in use may be restored without their removal. This method includes the controlled application of intense heat over the surface of the diffuser media. This heat is applied progressively to the entire surface of the diffuser in such a way that all portions of the area receive an equal amount of heat of uniform duration. In addition solvents may be applied to assist in removing matter which is in the pores, and more than one application of heat may be employed.

In order to explain the invention further, reference is made to the accompanying drawings, where Fig. 1 is a perspective view of an aeration tank cut away in vertical cross-section, showing the method in operation; Fig. 2 is a vertical cross-section of a diffuser plate set in an air distribution duct, with an adjoining plate cut-away to show the operation of the method on a larger scale; Fig. 3 is similar to Fig. 2, but shows another step in the operation of the method; and Fig. 4 shows the method applied to diffuser media having curved surfaces.

In Fig. 1 a common form of aeration tank 10 is shown, in which the air is supplied under pressure to a distribution box, or channel, 11 set in the bottom of the tank. The air is furnished by the usual apparatus, such as a blower, and is led to one end of the distribution box through a header (not shown) as is well known. In this type of installation the upper wall of the distribution boxes 11 is composed of a number of flat porous plates 12 laid side by side and held in place by cement grouting 13 around their edges. These plates are made of any suitable granular material together with a bonding material, and permit the air supplied to the ducts 11 to be diffused into the liquid ordinarily maintained in the tank 10 in the form of millions of tiny air bubbles.

As previously explained, prior methods of maintenance required the removal of each plate 12 which had become too clogged, after prolonged use, to efficiently pass air through it. This was true regardless of whether the plate was merely to be cleaned or to be replaced, and such removal necessitated the chipping away of the grouting 13, and subsequent replacement when either a new plate, or a cleaned plate was substituted.

In the performance of the present method of restoring the porosity of diffuser media it is unnecessary to remove the plates 12 for any reason unless they have cracked, or broken entirely.

Instead, this method utilizes the effects of a moving sheet of flame, which traverses the surfaces of the plates to effect a thermal spalling of the accumulated obstructive materials. One form of apparatus for accomplishing this result is shown, but it will be understood that the applicant is not limited to any particular apparatus in carrying out his invention. As exemplary of the kind of apparatus which may be used, there is shown in Fig. 1 a carriage 14, supported by suitable wheels 15 for longitudinal movement along a portable trackway 16 which may be laid on the floor of the tank 10 in a direction paralleling the rows of plates 12. A motor 17 is mounted on the carriage and is connected by any conventional means (not shown) with the wheels 15 in order to drive the carriage along the track. Electricity may be supplied to the motor by a flexible cable 18, and it will be understood that suitable control means may be employed in the motor circuit to control the speed of the motor as required.

The sheet-like flame is provided by a nozzle 19 which is provided on its lower surface with a row of closely-spaced openings which project the flame downwardly upon the surface of the plates. The nozzle is attached to an arm 20 which is secured to a supporting member 21 on the carriage 14 by means of an adjustable clamp 22 which permits the nozzle 19 to be properly positioned with respect to the plates 12. Flexible hoses 23 and 24 which supply gases, such as oxygen and acetylene, to the nozzle may also be secured to the arm 20. It will thus be apparent that with this arrangement when the nozzle 19 has been positioned with respect to the plates 12, and a suitable current supplied to the motor 17, the nozzle will be moved by the carriage 14 over the surface of the plates at a uniform speed which may be appropriately controlled. It will also be understood that the apparatus which has been described for moving the nozzle typifies only one arrangement for ensuring relative movement between a sheet-like flame and the diffuser media surface which is to be renewed.

In the performance of this method it is desirable to use an oxy-acetylene flame providing a flame of approximately 5000° F., and to adjust the nozzle 19 so that the flame strikes the plate at a slight angle with respect to the vertical and facing away from the direction of travel of the carriage. The spacing of the nozzle from the surface to be treated may vary somewhat, but the most satisfactory distance is between one inch and one and one-half inches, while the rate of travel of the nozzle over the surface may vary from a minimum of 4 inches per minute to a maximum of 50 inches per minute. The fact that the flame is concentrated along a thin line of surface prevents the plate from becoming overheated, which would be the result if the flame were allowed to spread out. Within the limits specified, it will often be sufficient to clear the clogging of the plates with a single pass of the flame over the surface, although in many cases it will be preferable to make at least two passes, and if the clogging is exceptionally deep it may be necessary to go over the surface an additional number of times. In any case, the plates should be reasonably dry when the flame is applied, and if more than one pass is made, the plates should be allowed to cool between passes.

One of the advantages of this method is that it permits the diffuser media to be cleaned in place, without requiring their removal from their permanent mountings. Where the plates are grouted in place, it has been found that the grouting between plates placed in a row, and over which the flame has travelled, is not damaged. It has been found that at the speeds used in this method, metals and concrete are unaffected, which allows the use of metal shields when thermal spalling is used with diffusers which are held in place with materials like rubber, etc. Of course no shield is required when the plates are set in grouting, and the gaskets placed on the under side of the plates are sufficiently protected by the plates themselves.

While the method just outlined is usually sufficient to open up the pores of diffusers which have not become deeply clogged, it may be desirable in certain cases to subject the plates to pretreatment before thermal spalling. In any event, it is obvious that before beginning any treatment, the aeration tank should be drained and sludge should be washed off the surface of the diffusers with a stream of water under pressure. Following the washing, the normal air supply to the diffusers should be turned on to dry out the plates. If no treatment is to be given prior to thermal spalling, air should be allowed to pass through the diffusers for approximately 24 hours, after which the flame may be applied. If the deposit of obstructive material is deep it will not be necessary to dry the plates as thoroughly, and the air may be cut off as soon as the surface of the plates are observed to appear dry. Thereafter a solution of sodium hypochlorite may be poured on the surface of the plates using only enough to fill the pores. After about one hour the plates should be wetted down again with a hose, and the air turned on to force the loosened material to the surface which material should then be swept away, together with the water and solution which comes to the surface. Solutions other than sodium hypochlorite may be used for this pre-treatment provided they do not wash the clogging material deeper into the diffusers, leave a clogging residue, or harm the diffusers or holders. As in the case where no pre-treatment is given, the air should be allowed to pass through the diffusers for about 24 hours in order to dry them thoroughly before thermal spalling is begun. When a heavy deposit of salts, lime, or similar fluxing material is found at the bottom of deep clogging it may be possible to reduce the number of thermal spalling passes required by treating this layer with hydrochloric, or other, acid in a manner previously described for sodium hypochlorite. After treatment with an acid at least one pass of thermal spalling should be made. If time is available, solutions used in pre-treatment may be allowed to dry without the addition of air being passed through the diffusers. This will bring most of the dissolved material to the surface of the plates where it can be removed further by brushing or thermal spalling.

Clogging which occurs on the inner surface (the surface through which the air enters before passing into the sewage in the tank) is usually less severe, and forms a thinner layer, than that which occurs on the outer surface. This bottom clogging may also be removed by thermal spalling. Where the plates are arranged in a horizontal row as in Fig. 1 a suitable mechanism may be employed to travel along the bottom of an air distribution duct 11 which will carry a nozzle, similar to nozzle 19, along the under side of plates 12. The mechanism may be introduced into the duct 11 by removing one of the plates.

Another method for removing bottom clogging from the inner surface is to utilize the hydraulic ramming action produced when a stream of water at high pressure is directed against the outer surface of the diffuser media, as shown in Fig. 3. The effectiveness of this operation is dependent upon the outer surface being free from obstructive material, otherwise this material would be forced more deeply into the interstices of the top surface. For this reason it is necessary first to remove such top clogging material, as by a method already described, before attempting to remove bottom clogging by this ramming, or jetting, action.

Furthermore, it may be desirable to introduce solutions into the interstices of the diffusers which will dissolve, or loosen, clogging materials before the jetting is done. As an example only, without limiting the scope of this invention, the following is a recommended procedure which may be employed. After the diffusers have been cleaned of any loose materials and washed with water at ordinary hydrant pressure the air should be turned on at low pressure (approximately 1½ lbs. per square inch) and the plates allowed to dry for about 4 hours, or more. After this drying, a wetting agent, such as ethyl alcohol, is poured on the top surface of the diffuser plates using about ½ to 1 pint of alcohol for each plate. During this operation the air is shut off on the plates while they are being treated. In addition to the alcohol, a semi-concentrated solution of liquid detergent may also be poured on the top surface, again using about ½ to 1 pint of the solution for each plate. As an example, the solution may consist of one part of liquid detergent, such as the product sold commercially under the name of "Glim," to 80 parts of water. In addition, this solution may also contain another two parts of standard clear ammonia solution. As soon as the detergent solution has been introduced into the pores of the plates, with the air supply still shut off, the plates should be jet washed for one minute with a concentrated stream of water such as that produced by an ordinary fire hose nozzle 25, as shown in Fig. 3, which may be moved over the surface of the plates as indicated by the arrows. As soon as the jet washing is completed the air supply to the diffusers should again be turned on, and continued until the tank is put back in service. During the period between the jet washing and return of the tank to use, the surface of the diffusers should occasionally have the solution and foam which accumulates on the top surface flushed off with a hose.

While the foregoing discussion has related in general to the practice of this method with flat diffuser media, the principles disclosed are equally applicable to porous media having irregular shaped surfaces. In Fig. 4, for example, there is shown a diffuser 26 of tubular cross-sectional construction. The procedures already described can be applied to a diffuser of this type without substantial modification of the principles involved. When it is desired to effect thermal spalling by moving a thin sheet-like flame over the surface of this diffuser it is possible to provide a nozzle 27 having a tubular shape similar to the surface to be treated which may be supported, as by the gas-supply pipe 28, on a travelling carriage (not shown) similar to the carriage 19 described in connection with the disclosure shown in Fig. 1. The inner periphery of the tube 27 may be provided with a series of small holes so as to direct the flame inwardly against the surface of the tubular diffuser 26 and as the tube is moved along the length of the diffuser, as shown by the arrow, heat of high intensity, but of short duration, will be applied evenly over the surface. Furthermore, by suitable modification of the nozzle 27 to make it conform to the surface to be treated other types of diffuser media may be thermally spalled by this method without danger of damaging the media and without removing them from their normal supports.

As a further aid in the removal of loose material from diffusers which have been treated by the various methods described, and particularly in the case of media having relatively large pores it may be desirable to induce vibration in the diffusers by means of high-frequency vibrators of well-known construction which may be brought into temporary contact with the diffusers for this purpose. Such vibration is particularly useful if the media have been thoroughly dried. In addition, loose particles in a dry state can be removed by a conventional vacuum cleaning apparatus.

While I have described my invention in some detail, it should be understood that the invention is not limited to the precise details described, but may be carried out in other ways, and with other apparatus.

I claim:

1. Method of restoring the porosity of aluminum oxide diffuser units, including the steps of directing a sheet-like flame against one surface of the unit, maintaining the flame at a fixed distance from the surface while effecting continuous uniform relative movement of said unit and said flame in a direction normal to the width of the flame, removing material thus freed from the interstices of said one surface, and directing a stream of liquid substantially at right angles against said one surface at high pressure to remove additional obstructive material by ramming action.

2. Method of restoring the porosity of ceramic air diffuser units composed of aluminum oxide and having two opposite surfaces, including the steps of directing a sheet-like flame against one surface of the unit, maintaining the flame at a fixed distance from said one surface while effecting continuous uniform relative movement of said unit and said flame in a direction normal to the width of the flame and parallel to said one surface, removing material thus freed from the interstices of said one surface, introducing solvent into the interstices of said one surface, and directing a stream of liquid into said interstices substantially at right angles to said one surface at high pressure to force obstructive material outwardly from the interstices of the opposite surface by ramming action.

3. Method of restoring the porosity of aluminum oxide diffuser units clogged by sewerage solids, including the steps of introducing a solvent into the interstices of the diffuser unit, wetting the surface of the unit, passing air through the unit to dry it, directing a sheet-like flame of uniform intensity along its width against the surface while maintaining the flame at a fixed distance from the surface and effecting automatically controlled continuous relative movement of the unit and the flame in a direction normal to the width of the flame and parallel to the surface of the unit, and directing a stream of liquid into said interstices substantially at right angles to the said one surface at high pressure to force obstructive material outwardly from the interstices of the opposite surface by ramming action.

References Cited in the file of this patent

Sewage Treatment Works, by Keefer, first edition, publ. 1940 by McGraw-Hill Book Co., Inc., N. Y.; pages 345–348 cited.